United States Patent
Walrant (10) Patent No.: US 10,715,333 B2
(45) Date of Patent: Jul. 14, 2020

(54) NETWORK MESSAGE AUTHENTICATION AND VERIFICATION

(71) Applicant: NXP B.V.

(72) Inventor: Thierry G. C. Walrant, Bouge (BE)

(73) Assignee: NXP B.V., Eindhoven (NL)

( * ) Notice: Subject to any disclaimer, the term of this patent is extended or adjusted under 35 U.S.C. 154(b) by 230 days.

(21) Appl. No.: 15/839,853

(22) Filed: Dec. 13, 2017

(65) Prior Publication Data

US 2018/0167216 A1    Jun. 14, 2018

(30) Foreign Application Priority Data

Dec. 14, 2016 (EP) .................................... 16204185

(51) Int. Cl.
*H04L 9/32* (2006.01)
*H04L 9/06* (2006.01)
(Continued)

(52) U.S. Cl.
CPC .......... *H04L 9/3242* (2013.01); *H04L 9/0643* (2013.01); *H04L 9/0894* (2013.01);
(Continued)

(58) Field of Classification Search
CPC ... H04L 9/3242; H04L 67/12; H04L 63/0428; H04L 63/08; H04L 61/6027;
(Continued)

(56) References Cited

U.S. PATENT DOCUMENTS 6,249,562 B1     6/2001 Wells
6,348,875 B1 *   2/2002 Odinak ................... H04L 9/085
                                                340/310.11
(Continued)

FOREIGN PATENT DOCUMENTS

CN    101517598 B    8/2009
CN    101807818 B    8/2010
(Continued)

OTHER PUBLICATIONS

Notice of Allowance for related U.S. Appl. No. 15/841,225 (dated Apr. 10, 2019) 8 pgs.
(Continued)

*Primary Examiner* — Kambiz Zand
*Assistant Examiner* — Aubrey H Wyszynski
(74) *Attorney, Agent, or Firm* — Rajeev Madnawat (57) ABSTRACT

The present application relates to an apparatus and method of authenticating and verifying a message frame on a multi-master access bus with message broadcasting. Logic bus identifier, LID, are associated with each one of a several logical groups of nodes out of a plurality of nodes connected to the multi-master access bus. A key is assigned to each logical group. The keys assigned to different logical groups differ from each other. For message authentication, a logic bus identifier, LID is provided and a key associated with the logic bus identifier, LID, is retrieved. A cryptographic hash value, MAC, is generated using the retrieved key and based on at least the logic bus identifier, LID. A message frame is composed, which comprises the logic bus identifier, LID, and the cryptographic hash value, MAC. For message verification, a message frame is received, which comprises at least a logic bus identifier, LID, and a cryptographic hash value, MAC. A key is retrieved, which is associated with the logic bus identifier, LID, extracted from the frame. A cryptographic verification hash value, VAC, is generated using the retrieved key and based on at least the logic bus identifier, LID. The cryptographic verification hash value, VAC, and the cryptographic hash value, MAC, extracted from the frame are compared. The received message frame is forward for further processing as a legitimate message frame.

15 Claims, 7 Drawing Sheets

(51) Int. Cl.
*H04L 9/08* (2006.01)
*H04L 29/12* (2006.01)
*H04L 29/06* (2006.01)
*H04L 29/08* (2006.01)
*H04W 4/44* (2018.01)
*H04L 9/14* (2006.01)
*H04L 12/40* (2006.01)
*H04W 12/06* (2009.01)

(52) U.S. Cl.
CPC .............. *H04L 9/14* (2013.01); *H04L 12/40* (2013.01); *H04L 61/6027* (2013.01); *H04L 63/0428* (2013.01); *H04L 63/08* (2013.01); *H04L 63/123* (2013.01); *H04L 67/12* (2013.01); *H04W 4/44* (2018.02); *H04W 12/06* (2013.01); *H04L 2012/40215* (2013.01); *H04L 2012/40273* (2013.01); *H04L 2209/84* (2013.01)

(58) Field of Classification Search
CPC . H04L 9/0894; H04L 9/0643; H04L 2209/84; H04L 2012/40215; H04L 2012/40273; H04L 9/14; H04L 12/40; H04L 63/123; H04W 12/06; H04W 4/44
USPC .......................................................... 713/168
See application file for complete search history.

(56) References Cited

U.S. PATENT DOCUMENTS

| | | | |
|---|---|---|---|
| 6,687,325 B1 | 2/2004 | Wells | |
| 6,836,853 B1 | 12/2004 | Dover et al. | |
| 7,043,581 B1 | 5/2006 | Gulick | |
| 8,027,609 B2 | 9/2011 | Van Buren et al. | |
| 8,302,176 B2 | 10/2012 | Huang | |
| 9,231,936 B1 | 1/2016 | Wang et al. | |
| 2004/0177213 A1 | 9/2004 | Engel et al. | |
| 2013/0145080 A1 | 6/2013 | Grandin | |
| 2015/0089236 A1 | 3/2015 | Han et al. | |
| 2016/0149908 A1 | 5/2016 | Unagami et al. | |
| 2016/0180095 A1 | 6/2016 | Sarangdhar | |
| 2017/0034867 A1 | 2/2017 | Oshida | |
| 2017/0161382 A1* | 6/2017 | Ouimet | G06F 16/78 |
| 2018/0175864 A1 | 6/2018 | Walrant et al. | |
| 2018/0373598 A1 | 12/2018 | Mondello et al. | |

FOREIGN PATENT DOCUMENTS

| | | |
|---|---|---|
| DE | 10 2012 219 079 A1 | 4/2014 |
| EP | 3 038 318 A1 | 6/2016 |
| WO | 2015125197 A1 | 8/2015 |

OTHER PUBLICATIONS

Sharma, S. et al. "An Efficient Distributed Group Key Management Using Hierarchical Approach with Elliptic Curve Cryptography", IEEE International Conference on Computational Intelligence & Communication Technology, Ghaziabad, pp. 687-693 (2015).

Mortazavi, S. A. et al. "An efficient distributed group key management using hierarchical approach with Diffie-Hellman and Symmetric Algorithm: DHSA", International Symposium on Computer Networks and Distributed Systems (CNDS), Tehran, pp. 49-54. (2011).

Adusumilli, P. et al. "DGKD: distributed group key distribution with authentication capability",Proceedings from the Sixth Annual IEEE SMC Information Assurance Workshop, pp. 286-293 (2005).

* cited by examiner

Fig. 1

▦ Group 1: 100.1, 100.2 and 100.5

▩ Group 2: 100.1 and 100.3

▨ Group 3: 100.4, and 100.6

NETWORK MESSAGE AUTHENTICATION AND VERIFICATION

CROSS-REFERENCE TO RELATED APPLICATIONS

This application claims the priority under 35 U.S.C. § 119 of European Patent application no. 16204185.9, filed on Dec. 14, 2016, the contents of which are incorporated by reference herein.

FIELD OF THE INVENTION

The present disclosure relates generally to in-vehicle networks and in particular to authentication of messages communicated over in-vehicle networks.

BACKGROUND

Modern vehicles are equipped with a large number of electronic control units, ECUs, which vary in processing capability, functionality and complexity. The electronic control units, ECUs, are used to monitor and control functional and safety critical components such as engine, transmission (powertrain) and safety components (e.g. airbags, seatbelt tensioners etc.), and non-critical components such as navigation, entertainment components and telematics. The electronic control units, ECUs, are interconnected via several in-vehicle networks including in particular Controller Area Network, CAN, which has become the de facto standard due to its widespread deployment. Other standards include the Local Interconnect Network (LIN), which was designed for simpler vehicle components, such as roof, power seats or windows, and FlexRay, which provides more capabilities but at the costs of complexity and expanse in comparison with CAN.

Controller Area Network, CAN, was originally designed without security in mind, and its design choices were greatly dominated by such strict constraints as low cost and low network latency in isolated/closed environments. Therefore, controller Area Network, CAN, protocol lacks data authentication or privacy, thus becoming susceptible to various attacks.

Vehicle manufacturers are now departing from this closed operation of in-vehicle networks by allowing external entities to send commands from a remote site to in-vehicle components for diagnosis and anti-theft purposes. Moreover, vehicle manufacturers also face the situation that electronic control units, ECUs, with interfaces exposing the communication on the in-vehicle networks to external entities are available to third parties. Connecting/exposing a vehicle's internal subsystems and communication between them to external entities create serious security and safety risks. The security architecture of CAN is too weak to deal with this type of exposure.

Improving security of the in-vehicle networks such as Controller Area Network, CAN, has to take into consideration that ECUs are typically very resource-constrained for cost and size reasons, which means that requiring them to perform more than a simple computation can degrade/compromise their intended functionality and/or required performance.

To address these and other weaknesses of existing CAN protocols, this disclosure proposes an efficient security protocol, which does not require modifications of current, cost-conscious in-vehicle networks. In particular, the disclosure proposes an efficient security protocol, which does not require modifications of the physical layer implementation of in-vehicle network enables electronic control units, ECUs.

SUMMARY

The present invention provides an apparatus for authenticating a message frame on a multi-master access bus with message broadcasting, an apparatus for verifying the authenticity of the message frame, a method for authenticating a message frame on a multi-master access bus with message broadcasting and a method of verifying the authentication of the message frame as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
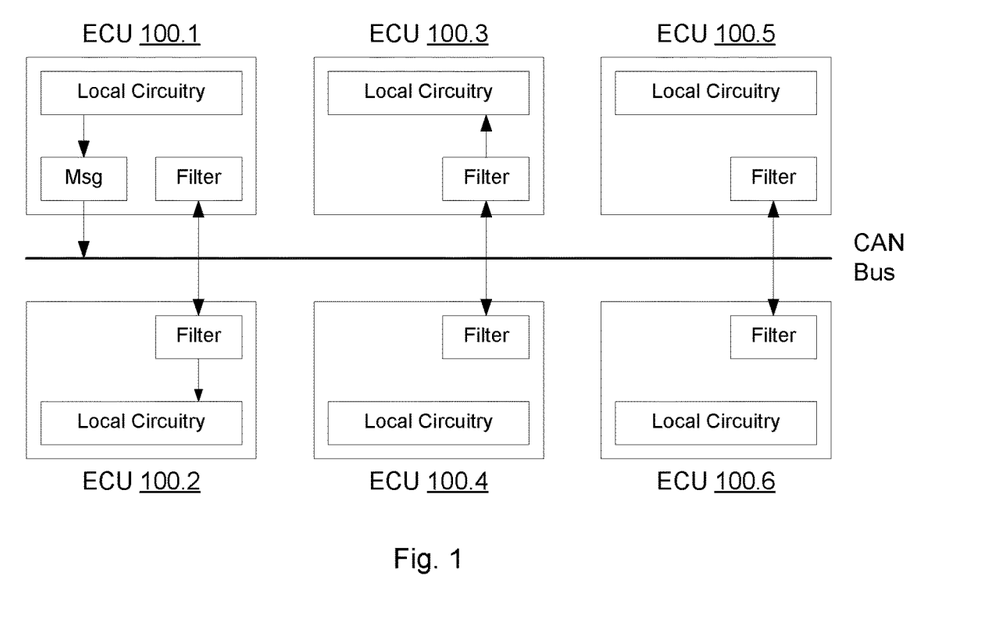
FIG. 1 schematically illustrates a block diagram of an in-vehicle network including several electronic control units, ECUs, according to an example of the present invention.

Referring to FIG. 1, a block diagram of a typical Controller Area Network, CAN, is schematically shown. The Controller Area Network, CAN, is a multi-master serial bus that connects electronic control units, ECUs, also referred to as (CAN) nodes in the following, for instance arranged inside a vehicle. Controller Area Network, CAN, enables a communication between the nodes without a central network controller.

Each node is allowed to broadcast messages in form of data frames on the CAN bus. The transmission order is decided via a bus contention mechanism called non-destructive bitwise arbitration. Each node broadcasts a message identifier, CANID, one bit signal a time, as part of a frame and determines the transmission priority by comparing each corresponding asserted bit signal with the bit signal currently active on the CAN bus. The frame with the smallest message identifier, CANID, wins the arbitration and gets transmitted. After winning the bus arbitration, the node writes the data of the message frame serially (one bit at a time) onto the CAN bus. Other nodes must wait for a predefined period after the winner's message transmission is completed.

Each message frame includes a message identifier, CANID, but does not need an address for neither the broadcaster/initiator nor the receiver/target node. On a frame broadcast over the serial CAN bus, each node proceeds with filtering by checking the message ID, CANID, to determine whether to accept or ignore it. In the illustrated example, the node/ECU 100.1 broadcasts a message Msg, which is received by all nodes/ECUs 100.2 to 100.6 connected to the CAN bus. For instance, the nodes/ECUs 100.3 and 100.2, accept the message, while the other nodes/ECUs 100.4, 100.5, and 100.6 discard the message. A filter unit in each node/ECU 100.1 to 100.6 compares the message identifier, CANID, of the message frame broadcast on the CAN bus for instance with one of one or more preconfigured message identifiers and forwards the message data to the local circuitry in case of a match.

It should be noted that Controller Area Network, CAN, is originally designed and standardized for in-vehicle use and, see for instance ISO 11898-1, ISO 11898-2 or related CAN standards, but not limited to the use automotive field. Controller Area Network, CAN, is also used in industrial automation, medical equipment, aerospace, and railway. This list is not exhaustive.

The CAN bus does not implement a methodology to identify a message frame broadcaster/initiator with proper authenticity. Recent exploits and attacks addressing automotive implantations of CAN buses have demonstrated the possibility to misuse a node to send illegitimate messages onto the CAN bus. Illegitimate messages on the CAN bus raise concerns regarding functional safety of the systems using CAN buses to broadcast safety critical information thereon. In the automotive use field, safety critical components such as subsystems of the breaking system/anti blocking system, power steering and airbags, are interconnected by CAN buses. Illegitimate messages may severely disrupt or shut off components thereof with the risk of sever or fatal injuries of users.

A way to impede exploits or attacks based on illegitimate messages is to implements several physically separated CAN buses to isolate groups of nodes from each other. However, this way is expensive and significantly increases the coverall complexity.

Figure 2:
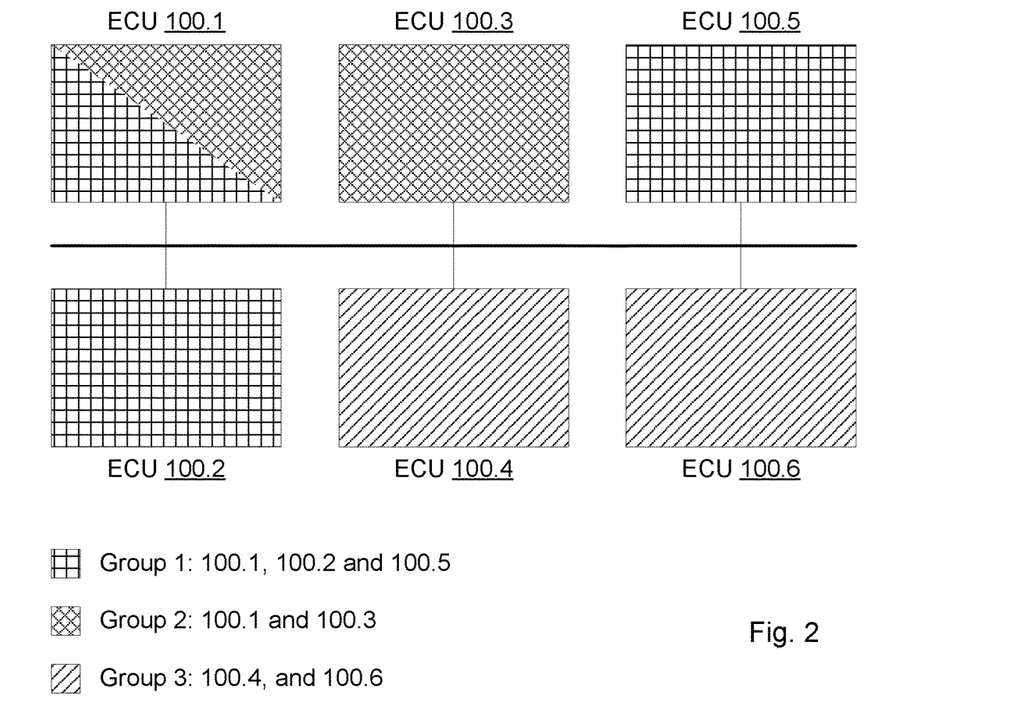
FIG. 2 schematically illustrates a block diagram of an in-vehicle network including several electronic control units, ECUs, each associated with one or more logical groups according to an example of the present invention.

Referring now to FIG. 2, a block diagram of a Controller Area Network, CAN, bus according to an embodiment of the present application is schematically shown. The nodes connected to the CAN bus of FIG. 2 are grouped into different groups. The communication between nodes of the same group is logically separated from the communication between nodes of other groups. As exemplified herein, the nodes/ECUs 100.1, 100.2 and 100.5 are assigned to or member of a first group, the nodes/ECUs 100.1 and 100.3 are assigned to or member of a second group, and the nodes/ECUs 100.4 and 100.6 are assigned to members of a third group. The logical isolation is achieved in that message broadcast on the CAN bus is associated with one group of the plurality of groups.

For instance, the node/ECU 100.3 intends to broadcast a message to the node/ECU 100.1. Both nodes 100.1 and 100.3 are member of the second group. The message should be a message verifiably as being a legitimate message by the receiving node/ECU 100.1. Legitimacy of messages is verifiable on the basis of message authentication codes. Only nodes/ECUs being member of the same group are enabled to successfully verify a message authentication code generated by any other one of this group. Successfully verified message authentication codes indicate legitimate messages. A node/ECU of another group is not enabled to successfully authenticate the message authentication codes. Hence, a logical separation of the communication is obtained. A message broadcast by the node/ECU 100.4 associated with the third group and identifiable as a legitimate message is provided with a message authentication code, which is successfully verifiable only by node being member of the third group, herein e.g. nodes/ECUs 100.4 and 100.6. A message broadcast by the node/ECU 100.5 associated with the first group and identifiable as a legitimate message is provided with a message authentication code, which is successfully verifiable only by the nodes assigned to the first group, herein e.g. nodes/ECUs 100.1, 100.2 and 100.5.

The node/ECU 100.1 is member of two groups, the first group and the second group. Hence, a message broadcast by the node/ECU 100.1 may be also associated with the first group, which enables the other nodes assigned to the first group, herein e.g. nodes/ECUs 100.1, 100.2 and 100.5, to identify such a message as legitimate on the basis of a message authentication code.

More general, nodes connected to a CAN bus are assigned to or member of at least one group out of a plurality of groups. Each message broadcast on the CAN bus is associated with one group of the broadcasting node. The broadcast message is considered as legitimate message only by the nodes, which are assigned to the same respective group, with which the broadcast message is associated.

The association of a message to a group is achieved by adding a logical bus identifier or logical group identifier, LID, to each message broadcast onto the CAN bus. The logical bus identifier or logical group identifier, LID is further accompanied with an authentication code, MAC, based on a secret logical bus key, $K_{LID}$, which is associated with the logical bus identifier or logical group identifier, LID, and shared among the nodes of one logical group. The secret logical bus keys, $K_{LID}$, differ for each group out of the plurality of logical groups. The authentication code, MAC, establishes message communications among the node/ECUs of one logical group, which message communication is logically separated from message communications among the nodes/ECUs of each other logical group. The authentication code, MAC, provides for authenticity and integrity of broadcast messages.

Figure 3:
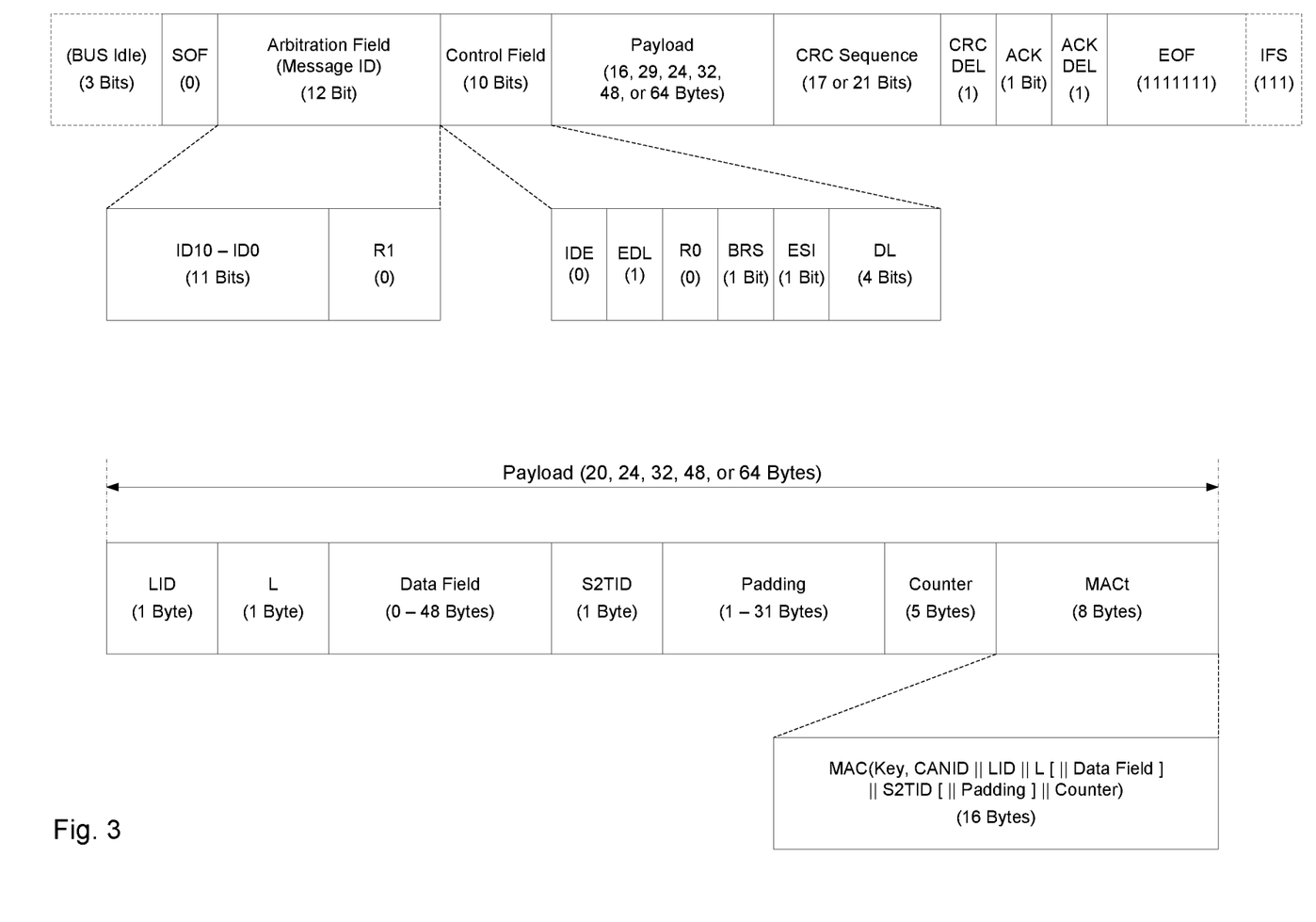
FIG. 3 schematically illustrates a block diagram of a frame format of a message according to an example of the present invention.

Referring now to FIG. 3, a block diagram of a frame format of a message according to an embodiment of the present application is schematically shown. There are four types of CAN message frame formats: a data frame format for transferring data payload; remote frame format for requesting transmission from a specific node/ECU; error frame format for indicating a detected error; and overload frame format for injecting delays between message broadcasts. The block diagram of the frame format relates to a data frame format. Further, block diagram of the frame format relates to a data frame format according to the CAN Flexible Data specification such as specified in ISO 11898-2:2015.

The CAN FD frame format provides for a data payload of up to 64 bytes. The header comprises a Start-Of-Frame bit, SOF, an arbitration field (12 bits) with the message identifier, CANID, (11 bits and 29 bits for extended format), and a control field (6 bits). The control field comprises an Identifier Extension Bit, IDE (dominant, 1 bit), an Extended Data Length Bit, EDL (recessive, 1 bit), a reserved bit, R0 (1 bit), a Bit Rate Switch Bit, BRS (1 bit), an Error State Indicator Bit, ESI (1 bit), and a Data length, DL (4 bits). The footer comprises a CRC sequence (17 or 21 bits), a CRC Delimiter Bit, CRC DEL (1 bit), an acknowledge Bit, ACK (1 bit), Acknowledge Delimiter Bit, ACK DEL (1 bit), End Of Frame, EOF, (7 bits) and Inter-Frame Gap, IFS (3 bits).

According to an example of the present application, the data payload is further structured in a message payload format, which comprises at least a logic bus identifier, LID, field, a data field for carrying the plain message data, and an authentication code, MAC, field. According to an example of the present application, the logic bus identifier, LID, has for instance a length of 1 byte (8 bits) and the an authentication code, MAC, may have a length of 8 bytes (64 bits).

The message payload format may comprises one or more further fields out of a length, L, field; a (message) data field; a sender identifier, S2TID, field; a padding field; and a counter field. The length, L, field allows for coding a length information relating to the length (amount) of the plain message data. The data field comprises the plain message data. The sender identifier, S2TID, field allows for carrying an identifier relating to the initiator/broadcaster of the CAN FD message. The sender identifier, S2TID, allows associating the counter value in the counter field with the sender based on the sender identifier, S2ID. For example, such counter values are provided by monotonic counters for authentication purpose and to prevent replay attacks.

The data field has a variable length and may comprise up to 48 bytes (384 bits). The padding field has a variable length and is applicable to align the length of the message payload to a specified length such as 16, 20, 24, 32, 48 or 64 bytes. The counter field allows for coding an initiator/broadcaster based counter value. The length, L, field may have a length of 1 byte (8 bits), the sender identifier, S2TID, field may have a length of 1 byte (8 bits), the padding field may have a variable length of up to 31 bytes (up to 248 bits), and the counter field may have a length of 5 bytes (40 bits).

The authentication code, MAC, allowing for verifying the authenticity of a message is based on a cryptographic hash function. The cryptographic hash function is based on a logical bus key, $K_{LID}$, which is specific to a logical group comprising a predefined selection nodes/ECUs enabled to communicate over the CAN bus. The cryptographic hash function is a one-way cryptographic hash function. According to an example of the present application, communication relates to at least one of broadcasting and receiving of messages conveyed on the CAN bus. The authentication code, MAC, is further based on one or more data values of fields comprised by the CAN message. The one or more field values may be concatenated, herein also indicated by the operation "∥" for the sake of description. The concatenation of two or more field values forms a data block, on the basis of which the authentication code, MAC, is determined. The one or more data values comprise one or more out of the group including the message identifier, CANID; the logic bus identifier, LID; the length, L; the plain message data comprised in the (message) data field; the sender identifier, S2TID; the padding data comprises in the padding field; and the counter value, Cntr.

According to an embodiment of the present application, the authentication code, MAC, is calculated based on a group specific logical bus key, $K_{LID}$, and a data block obtained by concatenating at least the message identifier, CANID; the logic bus identifier, LID; the length, L; the sender identifier, S2TID; and the counter value, Cntr. The data block may be obtained by further concatenating at least one of the plain message data and the padding data. In one example, the authentication code, MAC, is determined as following:

$$MAC = MAC(K_{LID}, CANID[\|\text{Data Field}]\|LID\|[\|\text{Padding Field}]\|L\|S2TID\|Cntr).$$

In an example, the length, L, may be coded in different ways for instance the length L indicated number of bytes or data length code (DLC) may be used to for the length L.

The authentication code, MAC, determined by the cryptographic hash function is further truncated. For instance, the authentication code, MAC, determined by the cryptographic hash function has a length of 16 bytes (128 bits) and the truncated to a length of 8 bytes (64 bits). The truncation algorithm to be used is selected with respect to a tradeoff between security level to be maintained and amount of data (length) required by the truncated authentication code, MAC. It should be noted that in the following, the authentication code, MAC, should be understood to refer to a cryptographic hash value or a truncated cryptographic hash value. In an example, the truncated MACt is a function of the authentication code, MAC:

$$MACt = \text{truncated } MAC(K_{LID}, CANID[\|\text{Data Field}] \|LID\|[\|\text{Padding Field}]\|L\|S2TID\|Cntr).$$

Figure 4:
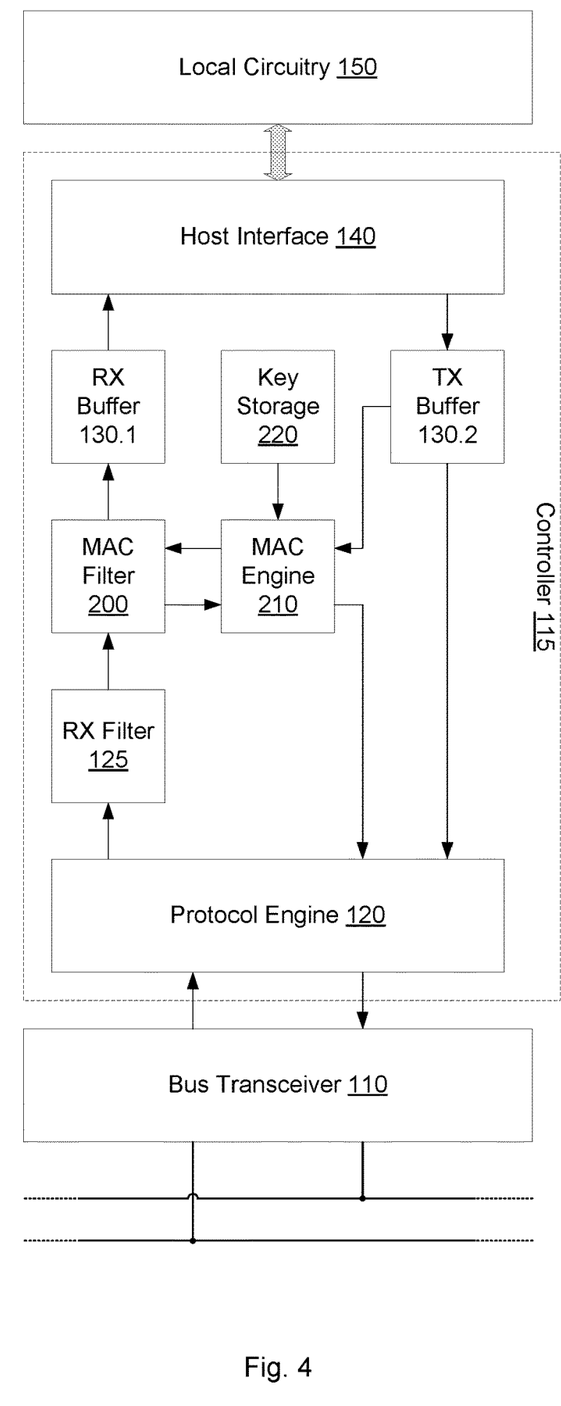
FIG. 4 schematically illustrates a block diagram of an ECU with a message authentication stage according to an example of the present invention.

Referring now to FIG. 4, a schematic block diagram of a node/ECU according to an embodiment of the present application is illustrated. The illustrated node/ECU comprises a bus transceiver 110, which interfaces between the CAN bus and the CAN controller/handler 115. The CAN controller/handler 115 enables communication between the local circuitry 150 of the node/ECU and the bus transceiver 110. A host interface 140 of the CAN controller/handler 115 interfaces between the CAN controller/handler 115 and the local circuitry 150 of the node/ECU. In an example of the present application, the CAN controller/handler 115 is part of a microcontroller or microprocessor and the host interfaces 140 couples to a data bus of the microcontroller or microprocessor. The host interfaces 140 may be further coupled to an interrupt controller (not shown) to signalize the presence of received message data available for being retrieved.

The bus transceiver 110 is configured to convert logic signals supplied by the CAN controller 115 into bus signals broadcast over the CAN bus and is arranged to convert bus signals detected on the CAN bus into logic signals supplied to the CAN controller 115. The bus transceiver 110 is arranged to accept from the CAN controller 115 logic signals representing a bit data stream of a frame to be broadcast on the CAN bus and to output to the CAN controller 115 logic signals representing a bit data stream of a frame broadcast on the CAN bus.

Typically, the CAN bus comprises two lines, on which bus signals are transmitted in from of two different differential signals representing the recessive and dominant signal states. The two bus lines are named typically named CANH and CANL for high and low signals, respectively, and are arranged in form of a twisted signal line pair. The bus transceiver 110 converts received bus signals into logic levels for the CAN controller 120 and drives logic 0's onto the CAN bus. The CAN bus normally remain in the logic-1 state signals, or the so-called dominant state signals on the CAN bus. In the recessive state, an equal voltage—usually between predefined CANH and CANL voltages—is maintained on each differential bus line. When the bus transceiver 110 drives the CAN bus with a logic-0 signal, a dominant state signal, the CANH line goes to a higher voltage and the CANL line goes to a lower voltage. In the recessive state or logic-1 state, the differential voltage on the CANH and CANL bus lines is for instance less than a minimum threshold. In the dominant state or logic-0 state, the differential voltage on the CANH and CANL bus lines is for instance greater than the minimum threshold. As already aforementioned with reference to arbitration, CAN communications use a Carrier-Sense Multiple-Access with Collision Detection (CSMA/CD) technique, in which a dominant bit or logic-0 bit signal overrides/dominates a recessive bit or logic-1 bit signal allowing for nondestructive bitwise arbitration.

The CAN controller 115 comprises a protocol engine 120, an RX filter 125, RX and TX buffers 130.1, 130.2 and the host interface 140.

The protocol engine 120 of the CAN controller 115 comprises a finite state machine, which is arranged to sequence through frames on a bit-by-bit basis, and change state for the various frame formats that are broadcasting or receiving. In particular, the protocol engine 120 is arranged to control the bit stream between transmit path and receive path in order to ensure that broadcasting, reception, arbitration, and error signaling are performed according to the CAN protocol.

Message data to be broadcast over the CAN bus is loaded into the transmit TX buffer 130.2 via the host interface 140 by the local circuitry 150 of the node/ECU. The transmit TX buffer 130.2 may comprise several TX buffers for message data with different priorities levels. For instance, the transmit TX buffer 130.2 may comprise a primary transmit TX buffer for message date with high priority and a secondary transmit buffer for message data with low priority. Message data in the primary transmit TX buffer are broadcast with higher priority than message data in the secondary transmit TX buffer with lower priority. The protocol engine 120 is for instance configured to compose a frame of prescribed format comprising the message data buffered in the transmit TX buffer 130.2 and to output the composed frame onto the CAN bus via the bus transceiver 110. The protocol engine 120 is for instance arranged to output the composed message frame in a serial stream of logic signals to the bus transceiver 110.

Similarly, the protocol engine 120 is arranged to receive frames in form of a serial streams of logic signals via the bus transceiver 110 interfacing with the CAN bus and is further arranged to decompose the received frames according to the frame formats. The protocol engine 125 comprises a message assembly buffer, MAB, (not shown), which functions to monitor the CAN bus for incoming messages. The message assembly buffer holds a bit stream for a received frame supplied by the bus transceiver 110.

The acceptance RX filter 125 is provided to check whether a received frame is intended for the node/ECU, and if so, the transfer of the buffered bit stream into the receive RX buffer 130.1 is enabled by the acceptance RX filter 125. The acceptance RX filter 125 is arranged to receive the message identifier, CANID, in the buffered bit stream representing data of a received frame and configured to compare that message identifier, CANID, to one or more filter value(s). If there is a match between the message identifier, CANID, and one filter value, then the buffered bit stream data is passed on for further processing. The acceptance RX filter 125 may apply one or more filter masks to select, which bits should be compared with the filter values. The data of a received frame can then be retrieved from the receive RX buffer 130.1 via the host interface 140. The receive RX buffer 130.1 may be a FIFO-like (first in first out) buffer. It should be noted that the CAN controller 115 may comprise one or more acceptance RX filters, each of which may be associated with a separate receive RX buffer, into which the data of a received frame is loaded in case of a match.

The CAN controller 115 further comprises a message authentication MAC filter 200 and a cryptographic engine 210.

The cryptographic engine 210 is for instance arranged between transmit TX buffer 130.2 and the protocol engine 120. The cryptographic 210 is configured to generate the authentication code, MAC, or truncated authentication code, MACt for the message data to be transmitted. The cryptographic engine 210 is accordingly supplied with the required information comprising the logical bus key, $K_{LID}$, which is specific to the logical group, to which the node/ECU is assigned, and the one or more data values on which the authentication code, MAC, or truncated authentication code, MACt, is further based. The cryptographic engine 210 is supplied with the logical bus key, $K_{LID}$, associated with the logical bus identifier, LID, included by the protocol engine 120 into the composed message frame comprising the generated the authentication code, MAC or truncated authentication code, MACt. The cryptographic engine 210 may retrieve the logical bus key, $K_{LID}$, from a key storage 220. The key storage 220 may comprise several secret keys, $K_{LID}$, each associated with a different logical bus identifier, LID.

The message authentication MAC filter 200 is for instance arranged between the acceptance RX filter 125 and the receive RX buffer 130.1. The message authentication MAC filter 200 is configured to authenticate the received message before the extracted data message of the received frame is loaded into the receive RX buffer 130.1 to ensure that the received message is also a legitimate message. The message authentication MAC filter 200 is arranged to compare the authentication code, MAC, or truncated authentication code, MACt, included in the received message with a verification code, VAC, or a truncated verification code, VACt, generated by the cryptographic engine 210. The message authentication MAC filter 200 supplies the logical bus identifier, LID, extracted from the received message to the cryptographic engine 210. The message authentication MAC engine 210 is arranged to retrieve the logical bus key, $K_{LID}$, associated with the extracted logical bus identifier, LID, for instance from the key storage 220 and to generate the verification code, VAC, or truncated verification code, VACt, based on the retrieved logical bus key, $K_{LID}$. The message authentication MAC filter 200 further supplies the one or more data values, on which the authentication code, MAC, or truncated authentication code, MACt, is further based to the cryptographic engine 210, to enable it to generate the verification code, VAC, or the truncated verification code, VACt.

In case the authentication code, MAC, or truncated authentication code, MACt, included in the received message is equal to the verification code, VAC, or the truncated verification code, VACt, generated by the cryptographic engine 210, the received message is accepted as legitimate and the extracted message data is loaded into the receive RX buffer 130.1.

Figure 5:
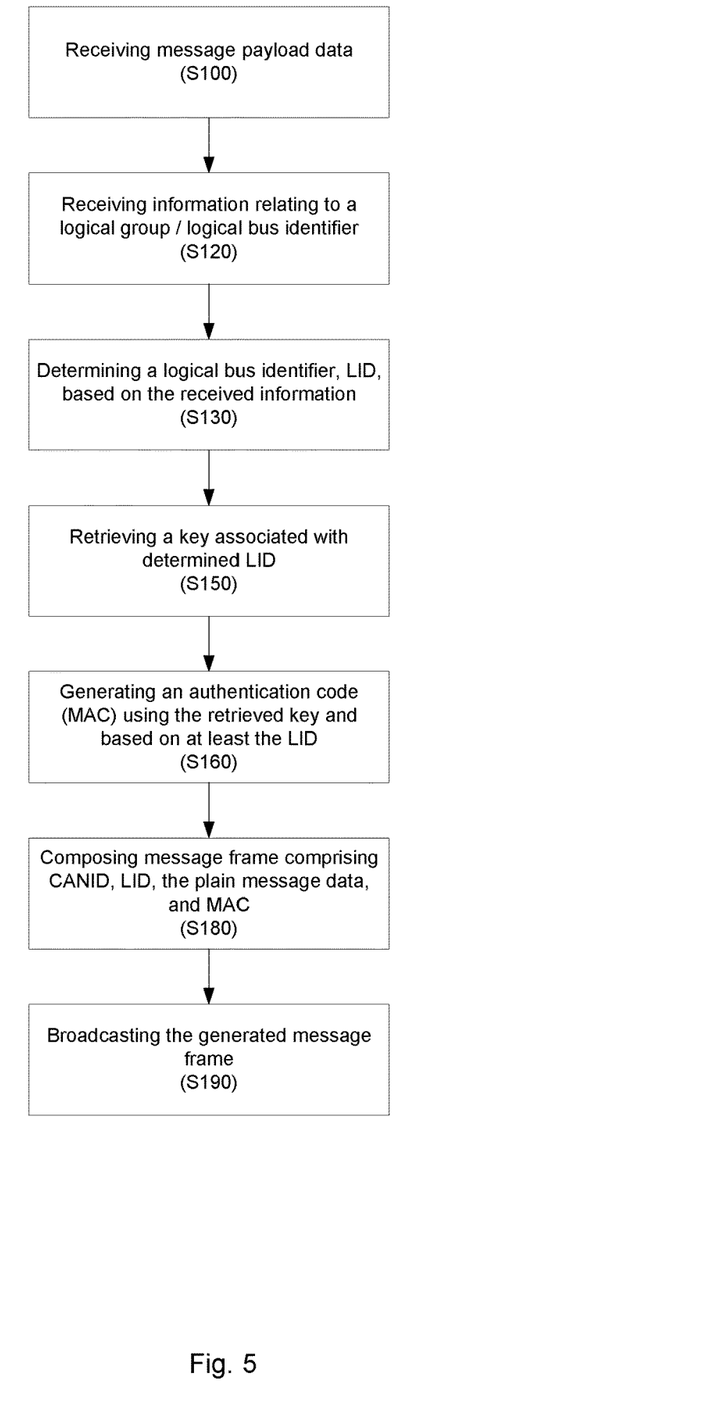
FIGS. 5 and 7 schematically illustrates a flow diagram of authenticating a message according to an example of the present invention.

With reference to FIG. 5, the authentication of messages will be further described on the basis of a flow diagram schematically illustrating a further example of the present application.

At a bus controller of a broadcasting node/ECU, the plain message data is provided in an operation S100. The plain message data is provided by the local circuitry of the broadcasting node/ECU. The plain message data may for instance comprise sensor data or sensor-related data.

At a protocol engine of the bus controller, the message frame is composed according to a predefined frame format. The message frame comprises the plain message data and further data relating to the various fields of the message frame such as a message identifier, CANID. In particular, the message frame comprises a logical bus identifier, LID, and an authentication code, MAC. The authentication code, MAC, is generated at the bus controller, for instance at authentication code, MAC, engine of the bus controller, using a cryptographic hash function. The authentication code, MAC, is based on a virtual logic bus key, $K_{LID}$, which is associated with a respective logical bus identifier, LID. The logical bus key, $K_{LID}$, is shared among selected nodes/ECUs, which are assigned to one of a plurality of logical groups. The authentication code, MAC, is further based on the logical bus identifier, LID. The authentication code, MAC, may be further truncated using a predefined truncation algorithm.

In an operation S150, the logical bus key, $K_{LID}$, for generating the authentication code, MAC, is retrieved. The authentication code, MAC, is computed in an operation S160 based on a predefined cryptographic hash function using the retrieved logical bus key, $K_{LID}$, from authentication base data comprising the logical bus identifier, LID. The authentication base data may further comprise at least one of a message identifier; a length, L, relating to the length (amount) of the plain message data; a sender identifier, S2TID; and a counter value. The authentication base data may also comprise the plain message data and/or the padding data. The authentication base data may be formed by concatenation. The authentication base data comprises values and/or data, which are included in plain-text format in the message frame.

In one example, the broadcasting node/ECU is assigned to one logical group. Accordingly, the message frames broadcast by the broadcasting node/ECU comprise authentication codes, which are generated using the logical bus key, $K_{LID}$, associated with the respective one logical group. The logical bus identifier, LID, to be included in message frames and the logical bus key, $K_{LID}$, to be used for generation of authentication codes, MAC, is predefinable at the broadcasting node/ECU and, in particular, the bus controller thereof.

In another example, the broadcasting node/ECU is assigned to two or more logical groups. Accordingly, the message frames broadcast by the broadcasting node/ECU comprise authentication codes, which are generated using one of the logical bus keys, $K_{LID}$, each of which associated with one respective logical group of the two or more logical groups, to which the broadcasting node/ECU is assigned. In order to enable the bus controller of the broadcasting node/ECU to select the logical bus key, $K_{LID}$, shared with the node/ECU, for which a message to be broadcast is intended, an information relating to a specific logical group is provided to the bus controller, in an operation S120. The information may be received from the local circuitry of the broadcasting node/ECU. The information may comprises for instance the logical bus identifier, LID; or a message identifier, CANID.

Based on the information relating to a specific logical group, a logical bus identifier, LID, is determined based on the provided information, in an operation S130. With the help of the determined logical bus identifier, LID, the bus controller is enabled to retrieve the respective logical bus key, $K_{LID}$, out of the one, two or more logical bus keys, $K_{LID}$, available to the broadcasting node/ECU and to generate an authentication code in order to legitimate a broadcast message frame at the target node/ECU.

The message frame composed by the protocol engine is then broadcast by the bus transceiver onto the CAN bus, in an operation S190.

Figure 6:
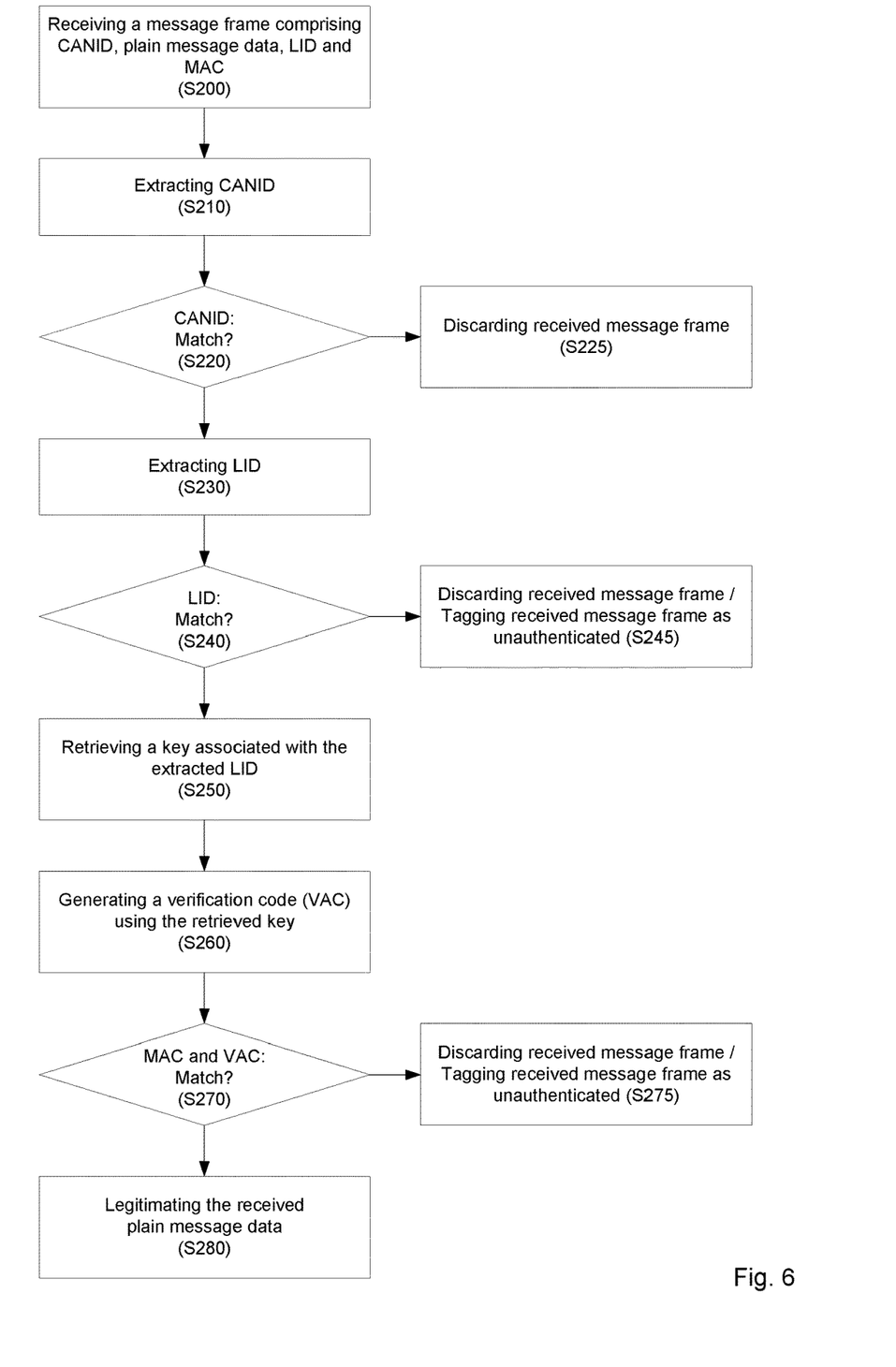
FIGS. 6 and 8 schematically illustrates a flow diagram of verifying an authenticated message according to an example of the present invention.

With reference to FIG. 6, the verification of messages will be further described on the basis of a flow diagram schematically illustrating a further example of the present application.

In an operation S200, a message frame broadcast on a CAN bus is received at a node/ECU connected thereto. The received message frame comprises among others a message identifier, CANID; a logical bus identifier, LID; message plain data; a counter value an authentication code, MAC.

At the bus controller of the node/ECU, the message identifier, CANID, is extracted in an operation S210 and compared to one or more predefined message identifiers, in an operation S220, in order to determine whether or not the node/ECU is the intended target node/ECU to receive the message frame. In case none of the one or more predefined message identifiers matches the extracted message identifier, CANID, the received message frame is discarded, in an operation S225.

Otherwise, the extracted message identifier, CANID, matches one of the one or more predefined message identifiers. In an operation S230, the logical bus identifier, LID, is extracted from the data frame. In an operation S240, it is verified whether the target node/ECU is member of the logical group indicated by the extracted logical bus identifier, LID. In case the target node/ECU is not member of the logical group defined by the extracted logical bus identifier, LID, the received message frame is for instance discarded or tagged (marked) as unauthenticated or illegitimate, in an operation S245.

Otherwise the target node/ECU is assigned to the logical group defined by the extracted logical bus identifier, LID, and based on the logical bus identifier, LID, a logical bus key, $K_{LID}$, is retrieved by the bus controller of the target node/ECU, in an operation S250. The retrieved logical bus key, $K_{LID}$, is associated with the logical bus identifier, LID.

A verification (authentication) code, VAC, is computed in an operation S260 based on the predefined cryptographic hash function using the retrieved logical bus key, $K_{LID}$, from authentication base data comprising the retrieved logical bus identifier, LID. The predefined cryptographic hash function and the authentication base data are the same as applied for the generation of the authentication code, MAC, comprises by the received message frame.

The generated verification (authentication) code, VAC, may be truncated in case the authentication code, MAC, comprises by the received message frame is a truncated authentication code, MAC. The truncation algorithm applied to the generated verification (authentication) code, VAC is the same as used for truncating the authentication code, MAC, comprises by the received message frame.

In an operation S270, the authentication code, MAC, extracted from the message frame and the generated verification (authentication) code, VAC, is compared. In case the extracted authentication code, MAC, and the generated verification (authentication) code, VAC, do not match, the received message frame is considered as an illegitimate message frame and for instance discarded or tagged/marked as unauthenticated or illegitimate, in an operation S275.

Otherwise, the extracted authentication code, MAC, and the generated verification (authentication) code, VAC, match each other and the received message frame is accepted as a legitimate message frame, in an operation S280. The plain message data comprised in the received message frame is provided by the bus controller of the target node/ECU for being further processed by the local circuitry of the target node/ECU.

In an example, the plain message data comprises in the received message considered as an illegitimate message is also provided to the bus controller of the target node/ECU for being further processed by the local circuitry of the target node/ECU. In order to distinguish from plain message data comprises in a received message considered as a legitimate message, the plain message data of such an illegitimate message may be further provided with an indication (flag) indicating that the authentication was unsuccessful or was not possible (e.g. due to group mismatch). Alternatively, plain data message data of legitimate messages may be provided with an indication (flag) indication a successful authentication.

In a further example of the present invention, the logical bus keys, $K_{LID}$, are associated with or comprises permission indications. Such a permission indication relates to the usage purpose of the respective logical bus key, $K_{LID}$. The permission indication indicates for instance that the respective logical bus keys, $K_{LID}$, is allows to be used for verification purpose, for authentication purpose or for verification and authentication purpose.

Such usage purpose limitation of a logical bus keys, $K_{LID}$, is for instance advantageous for implementing listening only nodes or broadcasting only nodes, which may not be misused for broadcasting and listening, respectively.

The authentication of messages has been described above with reference to the schematic flow diagram shown in FIG. 5. Permission indications comprised by or associated with logical bus keys, $K_{LID}$, requires a further operation S140 in advance to the retrieving of the logical bus key, $K_{LID}$, in the operation S150. As described above, the logical bus key, $K_{LID}$, to be retrieved may be identified based on a logical bus identifier, LID.

In the operation S140, the permission indication of the respective logical bus keys, $K_{LID}$, is obtained for instance based on the determined logical bus identifier, LID. The obtained permission indication is further checked whether or not the permission indication allows for using the respective logical bus keys, $K_{LID}$, for generating message authentication codes, MAC.

In case the permission indication indicated that the usage of the respective logical bus keys, $K_{LID}$, is allowed for generating of message authentication codes, MAC, the sequence commences to the operation S150, to retrieve the respective logical bus key, $K_{LID}$, for generating the authentication code, MAC.

In case the permission indication indicated that the usage of the respective logical bus keys, $K_{LID}$, is not allowed or forbidden for the generating of message authentication codes, MAC, the message payload data may be discarded or the message payload data may be passed to the protocol engine of the bus controller, which composes message frame comprising the CANID and the plain message data without message authentication code.

The verification of messages has been described above with reference to the schematic flow diagram shown in FIG. 6. Permission indication comprised by or associated with a logical bus key, $K_{LID}$, requires a further operation S246 in advance to the retrieving of the logical bus key, $K_{LID}$, in the operation S250 As described above, the logical bus key, $K_{LID}$, to be retrieved may be identified based on a logical bus identifier, LID.

In the operation S46, the permission indication of the respective logical bus keys, $K_{LID}$, is obtained for instance based on the extracted logical bus identifier, LID. The obtained permission indication is further checked whether or not the permission indication allows for using the respective logical bus keys, $K_{LID}$, for verifying message authentication codes, MAC.

In case the permission indication indicated that the usage of the respective logical bus keys, $K_{LID}$, is allowed for verifying of message authentication codes, MAC, the sequence commences to the operation S250, to retrieve the respective logical bus key, $K_{LID}$, for generating the authentication code, MAC.

In case the permission indication indicated that the usage of the respective logical bus keys, $K_{LID}$, is not allowed or forbidden for the verifying of message authentication codes, MAC, the received message frame may be discarded or the received message frame may be tagged as an unauthorized message frame.

The plain message data comprised in the received message frame tagged as being unauthorized may be provided by the bus controller of the target node/ECU for being further processed by the local circuitry of the target node/ECU. The local circuitry of the target node/ECU may comprise a logic to distinguish between message data extracted from authorized and unauthorized message frames. The local circuitry of the target node/ECU may comprise different logics to process message data extracted from authorized and unauthorized message frames, respectively.

According to an embodiment of the present application, a method of authenticating a message frame on a multi-master access bus with message broadcasting is provided. A logic bus identifier, LID, out of a plurality of logic bus identifiers is provided. The logic bus identifier, LID, is associated with one logical group of nodes out of a plurality of nodes connected to the multi-master access bus. A key associated with the logic bus identifier, LID, is retrieved. The keys assigned to the logical groups differ from each other. A cryptographic hash value, MAC, is generated using the retrieved key and based on at least the logic bus identifier, LID. A message frame is composed, which comprises the logic bus identifier, LID, and the cryptographic hash value, MAC.

According to an example, one or more keys are maintained in a key storage (220). Each key is shared by the nodes of one logical group. One logic bus identifier, LID, is assigned to each logical group. Each logic bus identifier, LID, differs from each other. Each of the plurality of nodes connected to the multi-master access bus is assigned to at least one logical group out of the plurality of groups.

According to an example, the generated cryptographic hash value, MAC, is further based on at least one value of a message identifier; CANID; a data length information, L; a sender identifier, S2TID; and a counter value. The at least one value on which the generated cryptographic hash value, MAC, is comprised in the message frame in plain text.

According to an example, information relating to a logical group of nodes is retrieved and the logic bus identifier, LID, to be provided is determined based on the received information.

According to an example, the key is associated with a permission indication relating to a usage limitation of the key. The permission indication of the key is obtained and it is verified that the permission indication allows for using the key for generating the cryptographic hash value, MAC, in advance to using the key.

According to an embodiment of the present application, a method of verifying the authenticity of a message frame on a multi-master access bus with message broadcasting is provided. The message frame is received, which comprises at least a logic bus identifier, LID, and a cryptographic hash value, MAC. The extracted logic bus identifier, LID, is one out of a plurality of logic bus identifiers. Each logic bus identifier, LID, is associated with one logical group of nodes out of a plurality of nodes connected to the multi-master access bus. A key is retrieved, which is associated with the logic bus identifier, LID, extracted from the frame. A different key is assigned to each one of the logical groups. A cryptographic verification hash value, VAC, is generated using the retrieved key and based on at least the logic bus identifier, LID. The cryptographic verification hash value, VAC, and the cryptographic hash value, MAC, extracted from the frame are compared. The received message frame is forward for further processing as a legitimate message frame.

According to an example, the cryptographic hash value, MAC, and the cryptographic verification hash value, VAC, are generated using the same cryptographic hash function.

According to an example, the generated cryptographic verification hash value, VAC, is further based on at least one value of a message identifier; CANID; a data length information, L; a sender identifier, S2TID; and a counter value. The at least one value, on which the generated cryptographic verification hash value, VAC, is based, is extracted from the received frame.

According to an example, a message identifier, CANID, comprised in the received and extracted therefrom is compared by an acceptance filter with one or more filter values. The received frame is discarded in case of all of the one or more filter values mismatch.

According to an example, the key is associated with a permission indication relating to a usage limitation of the key. The permission indication of the key is obtained and it is verified that the permission indication allows for using the key for generating the cryptographic verification hash value, VAC.

According to an embodiment of the present application, an apparatus for authenticating a message frame on a multi-master access bus with message broadcasting is provided. The apparatus comprises a key storage for storing a key associated with a logic bus identifier, LID. The logic bus identifier, LID, is provided out of a plurality of logic bus identifiers. Each logic bus identifier, LID, is associated with a respective logical group of nodes out of a plurality of nodes connected to the multi-master access bus. The apparatus further comprises a cryptographic engine, which is configured to generate a cryptographic hash value, MAC, using the key retrieved from the key storage and based on at least the logic bus identifier, LID. The apparatus further comprises a protocol engine, which is configured to compose a message frame comprising the logic bus identifier, LID, and the cryptographic hash value, MAC.

According to an embodiment of the present application, an apparatus for verifying the authenticity of a message frame on a multi-master access bus with message broadcasting is provided. The apparatus comprises a protocol engine, which is configured to receive the frame comprising at least a logic bus identifier, LID, and a cryptographic hash value, MAC. The apparatus further comprises a key storage for storing a key associated with a logic bus identifier, LID. The apparatus further comprises an cryptographic engine, which is configured to retrieve the key from the key storage, which key is associated with the logic bus identifier, LID, extracted from the frame, and to generate a cryptographic verification hash value, VAC, using the retrieved key the and based on at least the logic bus identifier, LID. The apparatus further comprises a filter, which is configured to compare the cryptographic verification hash value, VAC, and the cryptographic hash value, MAC, extracted from the frame and to discard the received frame in case of a mismatch.

According to an example, an acceptance filter of the apparatus is configured to receive a message identifier, CANID, comprised in the received frame, to compare the message identifier, CANID, extracted from the received frame with one or more filter values and to discard the received frame in case all of the one or more filter values mismatch.

According to an example, the multi-master access bus is a CAN bus.

According to an example, the message frame is a CAN data frame. The logic bus identifier, LID, and the cryptographic hash value, MAC, is comprised in the data payload of the CAN data frame.

Figure 7:
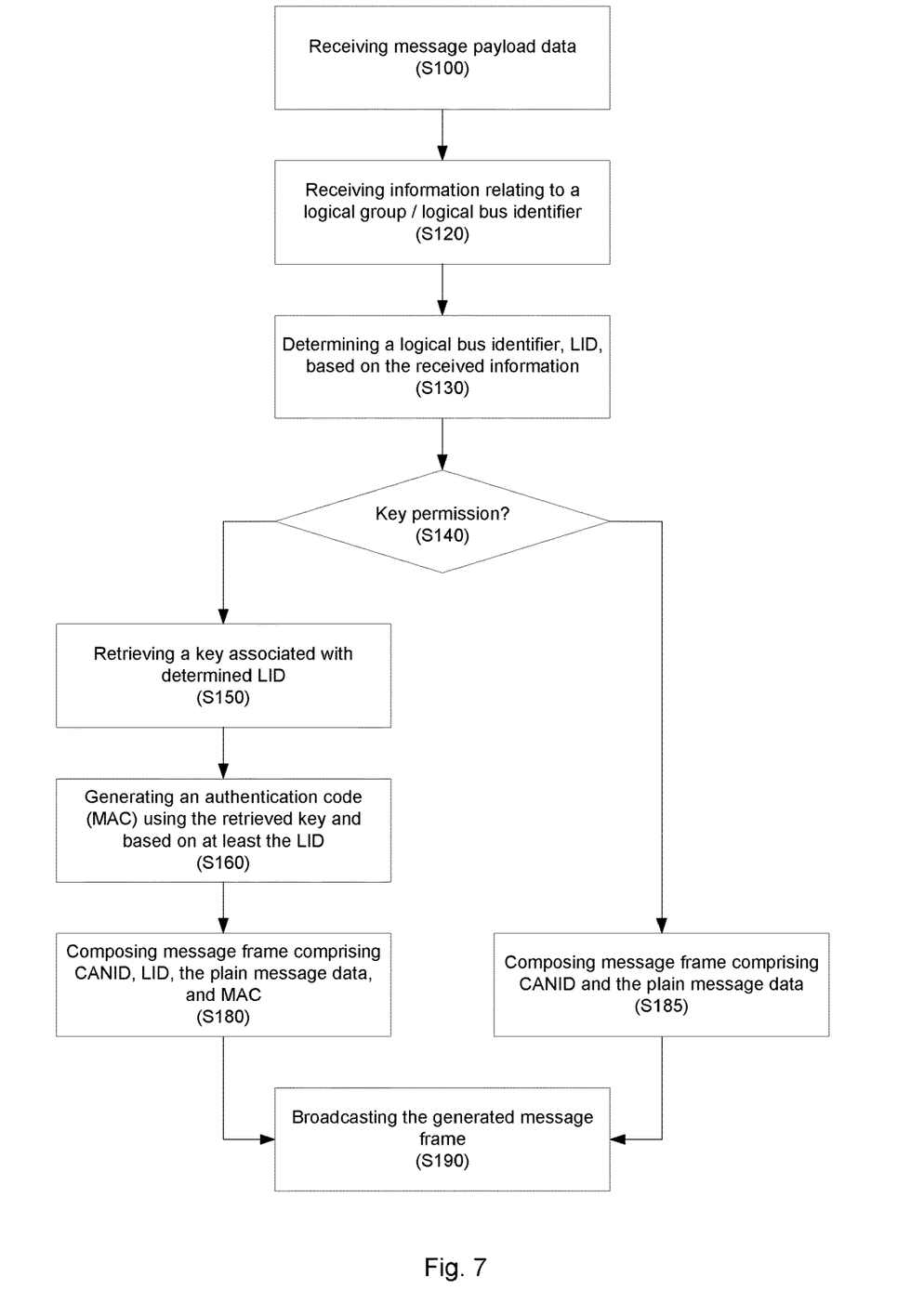

FIG. 7 schematically illustrates a flow diagram of authenticating a message. Accordingly, at step S100, the message payload data is received. At step S120, the information relating to a logical group/logical bus identifier is received. At step S130, a logical bus identifier, LID is determined based on the received information. At decision step S140, key permission is checked. At step S150, the key associated with determined LID is retrieved. At step S160, an authentication code (MAC) is generated using the retrieved key and based on at least the LID. At step S180, message frame comprising CANID, LID, the plaint message data, and MAC is composed. At step S185, a message frame comprising CANID and the plain message data is composed. At step S190, the generated message frame is broadcasted.

Figure 8:
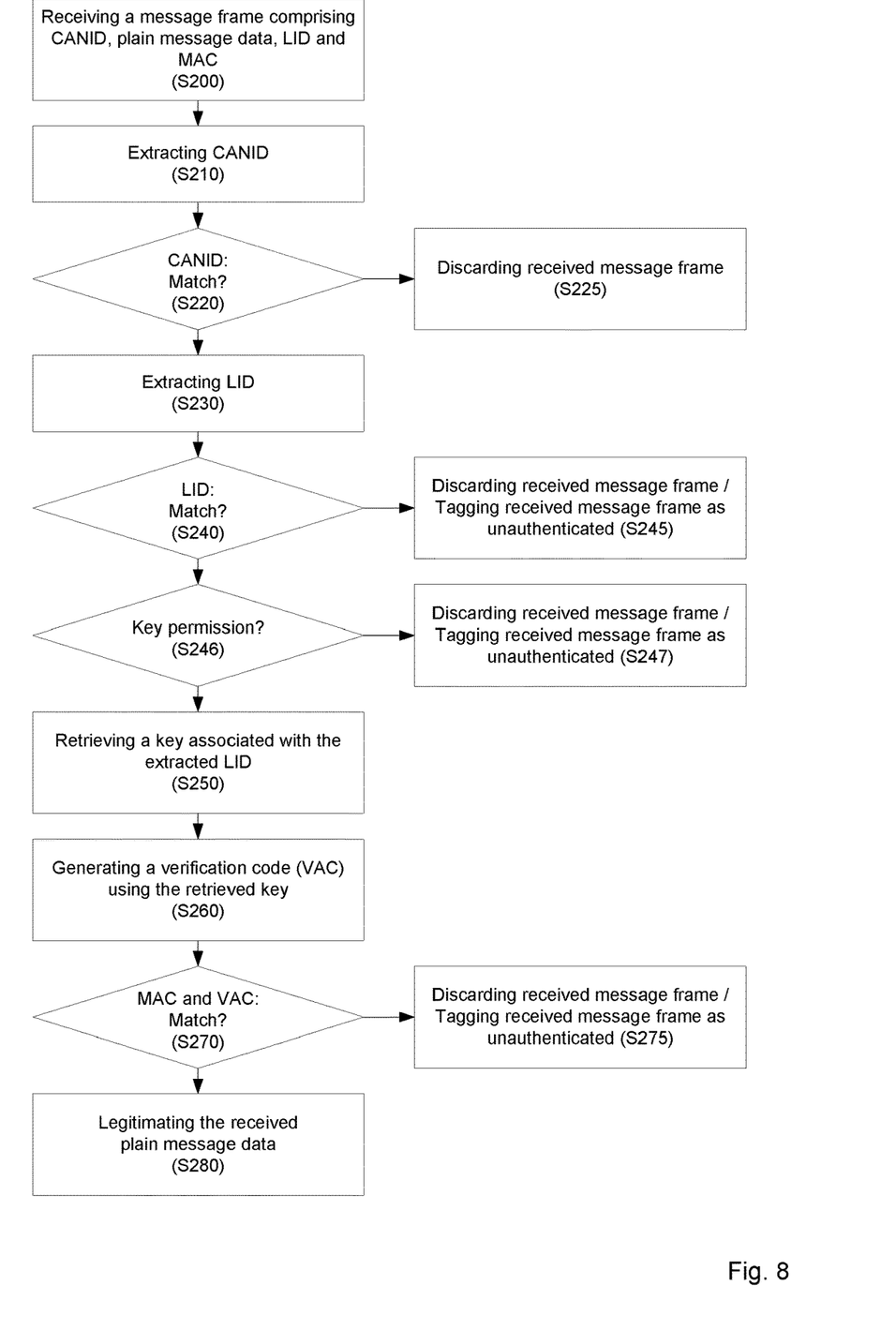

FIG. 8 schematically illustrates a flow diagram of verifying an authenticated message. Accordingly, at step S200, a message frame comprising CAN ID, plain message data, LID and MAC is received. At step S210, CANID is extracted. At decision step S220, CANID match is checked. At step S225, the received message frame is discarded if no CANID match. At step S230, LID is extracted. At decision step S240, LID match is checked. At step S245, the received message frame is discarded and the received message frame is tagged as unauthenticated. At decision step S246, key permission is checked. At step S247, the received message frame is discarded and the received message frame is tagged as unauthenticated. At step S250, a key associated with the extracted LID is retrieved. At decision step S260, a verification code (VAC) is generated using the retrieved key. At decision step S270, MAC and VAC match is checked. At step S275, the received message frame is discarded and the received message frame is tagged as unauthenticated. At step S280, the received plain message data is legitimated.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of authenticating a message frame on a multi-master access bus with message broadcasting, said method comprising:
   providing a logic bus identifier, LID, out of a plurality of logic bus identifiers, wherein the logic bus identifier, LID, is associated with one logical group of nodes out of a plurality of nodes connected to the multi-master access bus;
   determining a key permission of a key;
   retrieving the key associated with the logic bus identifier, LID, in response to the key permission permitting message broadcasting, wherein a different key is assigned to each logical group;
   generating a cryptographic hash value, MAC, using the retrieved key and based on at least the logic bus identifier, LID; and
   composing a message frame comprising the logic bus identifier, LID, and the cryptographic hash value, MAC.

2. The method according to claim 1, further comprising:
   maintaining one or more keys in a key storage, wherein each key is shared by the nodes of one logical group, wherein one logic bus identifier, LID, is assigned to each logical group, wherein each logic bus identifier, LID, differs from each other,
   wherein each of the plurality of nodes connected to the multi-master access bus is assigned to at least one logical group out of the plurality of groups.

3. The method according to claim 1,
   wherein the generated cryptographic hash value, MAC, is further based on at least one value of a message identifier; CANID; a data length information, L; a sender identifier, S2TID; and a counter value,
   wherein the at least one value on which the generated cryptographic hash value, MAC, is comprised in the message frame in plain text.

4. The method according to claim 1, further comprising:
receiving information relating to a logical group of nodes; and
determining the logic bus identifier, LID, to be provided based on the received information.

5. The method according to claim 1,
wherein the key is associated with a permission indication relating to a usage limitation of the key,
the method further comprising:
obtaining the permission indication of the key; and
verifying that the permission indication allows for using the key for generating the cryptographic hash value, MAC.

6. A method of verifying the authenticity of a message frame on a multi-master access bus with message broadcasting, said method comprising:
receiving the frame comprising at least a logic bus identifier, LID, and a cryptographic hash value, MAC, wherein the extracted logic bus identifier, LID, is one out of a plurality of logic bus identifiers, wherein each logic bus identifier, LID, is associated with one logical group of nodes out of a plurality of nodes connected to the multi-master access bus;
determining a permission of a key;
retrieving the key associated with the logic bus identifier, LID, extracted from the frame, in response to the key permission permitting verifying the authenticity of the message frame, wherein a different key is assigned to each logical group;
generating a cryptographic verification hash value, VAC, using the retrieved key and based on at least the logic bus identifier, LID;
comparing the cryptographic verification hash value, VAC, and the cryptographic hash value, MAC, extracted from the frame; and
forwarding the received message frame as a legitimate message frame.

7. The method according to claim 6, further comprising:
wherein the cryptographic hash value, MAC, and the cryptographic verification hash value, VAC, are generated using the same cryptographic hash function.

8. The method according to claim 6, further comprising:
wherein the generated cryptographic verification hash value, VAC, is further based on at least one value of a message identifier; CANID; a data length information, L; a sender identifier, S2TID; and a counter value,
wherein the at least one value, on which the generated cryptographic verification hash value, VAC, is based, is extracted from the received frame.

9. The method according to claim 6, further comprising:
comparing by an acceptance filter a message identifier, CANID, comprised in the received and extracted therefrom with one or more filter values; and
discarding the received frame in case of all of the one or more filter values mismatch.

10. The method according to claim 6,
wherein the key is associated with a permission indication relating to a usage limitation of the key,
the method further comprising:
obtaining the permission indication of the key; and
verifying that the permission indication allows for using the key for generating the cryptographic verification hash value, VAC.

11. An apparatus for authenticating a message frame on a multi-master access bus with message broadcasting, said apparatus comprising:
a key storage for storing a key associated with a logic bus identifier, LID,
wherein the logic bus identifier, LID, is provided out of a plurality of logic bus identifiers, wherein each logic bus identifier, LID, is associated with a respective logical group of nodes out of a plurality of nodes connected to the multi-master access bus;
a cryptographic engine configured to generate a cryptographic hash value, MAC, using the key retrieved from the key storage and based on at least the logic bus identifier, LID, wherein the key includes a key permission indicator to permit message broadcasting; and
a protocol engine configured to compose a message frame comprising the logic bus identifier, LID, and the cryptographic hash value, MAC.

12. An apparatus for verifying the authenticity of a message frame on a multi-master access bus with message broadcasting, said apparatus comprising
a protocol engine configured to receive the frame comprising at least a logic bus identifier, LID, and a cryptographic hash value, MAC;
a key storage for storing a key associated with a logic bus identifier, LID;
a cryptographic engine configured to retrieve the key from the key storage, wherein the key is associated with the logic bus identifier, LID, extracted from the frame, and to generate a cryptographic verification hash value, VAC, using the retrieved key and based on at least the logic bus identifier, LID, wherein the key includes a key permission indicator to permit verification of the authenticity of the message frame; and
a filter configured to compare the cryptographic verification hash value, VAC, and the cryptographic hash value, MAC, extracted from the frame and to discard the received frame in case of a mismatch.

13. The apparatus according to claim 12, further comprising:
an acceptance filter configured to receive a message identifier, CANID, comprised in the received frame, to compare the message identifier, CANID, extracted from the received frame with one or more filter values and to discard the received frame in case all of the one or more filter values mismatch.

14. The apparatus according to claim 11,
wherein the multi-master access bus is a CAN bus.

15. The apparatus according to claim 11,
wherein the message frame is a CAN data frame,
wherein the logic bus identifier, LID, and the cryptographic hash value, MAC, is comprised in the data payload of the CAN data frame.

* * * * *